(12) United States Patent
Schmidl et al.

(10) Patent No.: US 7,218,894 B2
(45) Date of Patent: May 15, 2007

(54) INTERFERER DETECTION AND CHANNEL ESTIMATION FOR WIRELESS COMMUNICATIONS NETWORKS

(75) Inventors: Timothy M. Schmidl, Dallas, TX (US); Eko N. Onggosanusi, Allen, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 568 days.

(21) Appl. No.: 10/738,508

(22) Filed: Dec. 17, 2003

(65) Prior Publication Data

US 2004/0224636 A1 Nov. 11, 2004

Related U.S. Application Data

(60) Provisional application No. 60/469,179, filed on May 9, 2003.

(51) Int. Cl.
*H04B 17/00* (2006.01)
(52) U.S. Cl. .................................. 455/67.11; 455/63.1
(58) Field of Classification Search ............ 455/67.11, 455/63.1; 375/341, 346, 348, 349
See application file for complete search history.

(56) References Cited

U.S. PATENT DOCUMENTS 7,079,601 B2 * 7/2006 He .............................. 375/340

OTHER PUBLICATIONS

"GSM Technical Specification: Digital Cellular Telecommunications System (Phase 2+): General Description of GSM Public Land Mobile Network (PLMN)," GSM 01.02, Revision 5.0.0, Mar. 1996, European Telecommunications Standards Institute, Valbonne, France.
"Chapter 3: Radio Aspects: Interference Suppression By Joint Demodulation of Cochannel Signals", 1999, Kluwer Academic, Dordrecht, Netherlands, XP002331762, ISBN: 0792383516. Retrieved from the Internet: URL: http://lib.tkk.fi/Diss/2003/isbn9512267179/article8.pdf>, retrieved on Jun. 14, 2005, pp. 1-31.
"Channel Estimation Modeling", Online 2000, pp. 1-15, XP002331761, Retrieved from the Internet: URL: http://www.comblab.hut.fi/opetus/260/chan_est.pdf>, Retrieved on Jun. 14, 2005, Section III, Least-squares (LS) channel estimation.
"Co-Channel Interference Canceling Receiver for TDMA Mobile Systems", Communications—Gateway to Globalization Proceedings of the International Conference on Communications, Seattle, Jun. 18-22, 1995, Proceedings of the International Conference on Communications (ICC), New York, IEEE, vol. 1, Jun. 18, 1995, pp. 17-21, XP000532964, ISBN: 0-7803-2487-0.

* cited by examiner

*Primary Examiner*—Lee Nguyen
(74) *Attorney, Agent, or Firm*—Ronald O. Neerings; Wade James Brady, III; Frederick J. Telecky, Jr.

(57) ABSTRACT

System and method for improving performance of digital wireless communications systems in the presence of interferers. A preferred embodiment comprises generating a list of hypotheses from a list of known interferers and timing offsets, receiving a signal transmitted over-the-air, computing an error variance for each hypothesis, and selecting the hypothesis with the lowest error variance. The hypothesis can then be used to extract data from the received signal.

22 Claims, 4 Drawing Sheets

INTERFERER DETECTION AND CHANNEL ESTIMATION FOR WIRELESS COMMUNICATIONS NETWORKS

This application claims the benefit of U.S. Provisional Application No. 60/469,179, filed May 9, 2003, entitled "Interferer Detection and Channel Estimation for GSM", which application is hereby incorporated herein by reference.

CROSS-REFERENCE TO RELATED APPLICATIONS

This application is related to the following co-pending and commonly assigned patent applications: Ser. No. 10/732978, filed Dec. 11, 2003, entitled "Multiuser Detection for Wireless Communications Systems in the Presence of Interference," which application is hereby incorporated herein by reference; and Ser. No. 10/747461, filed Dec. 29, 2003, entitled "Linear Single-Antenna Interference Cancellation Receiver."

TECHNICAL FIELD

The present invention relates generally to a system and method for digital wireless communications, and more particularly to a system and method for improving performance of digital wireless communications systems in the presence of interferers.

BACKGROUND

Interference is a major source of concern for the designers of wireless communications networks. Interference can reduce the overall performance of the communications system and if severe enough, cause the communications system to fail altogether. Interference can come from other electrical and electronic devices operating in the general vicinity and from other devices in the same communications network which are transmitting in the same (or adjacent) frequency band.

Interference from other devices in the same communications network can become a problem as designers of the communication network attempt to increase network capacity. For example, one way to increase network capacity is to increase frequency reuse, i.e., allow devices that are relatively close to one another to transmit in the same frequency band. In cellular communications networks, adjacent cell sites typically do not operate in the same frequency bands. However, through cell site sectoring, frequency reuse can be increased, therefore increasing network capacity. Unfortunately, when devices, which are close to one another, transmit in the same frequency band or in adjacent frequency bands, interference can occur. When devices transmit within the same frequency band, co-channel interference can occur, while adjacent channel interference can occur if devices transmit in adjacent bands if sufficient inter-band spacing is not provided.

In a GSM (Global System for Mobile Telephony) wireless communications system, for example, information is transmitted in bursts, wherein each burst may consist of two packets of data bits with a 26 bit mid-amble in between the two bursts. According to the GSM technical standards, one of eight possible training sequence codes (TSC) can be used as the mid-amble. In GSM communications systems, attempts to increase system capacity have resulted in increased co-channel and adjacent channel interference.

Several attempts to reduce interference have been proposed. Most of the prior art relies on using at least two antennas at the receiver to suppress interference. However, due to cost reasons there is generally only one antenna in GSM handsets. With a single antenna at the receiver, one single antenna interference cancellation (SAIC) technique is to use the joint MLSE receiver.

A disadvantage of the prior art is that the complexity of the receiver can become very high. For example if the conventional receiver requires a 16-state Viterbi demodulator, then a joint MLSE which suppresses one interferer would require 256-states, which is a 16-fold increase in complexity.

SUMMARY OF THE INVENTION

These and other problems are generally solved or circumvented, and technical advantages are generally achieved, by preferred embodiments of the present invention which provides for a system and method for improving the performance of wireless communications systems in the presence of interferers.

In accordance with a preferred embodiment of the present invention, a method for detecting interferers comprising generating a list of hypotheses, receiving a signal transmitted over-the-air, computing an error variance for each hypothesis in the list using the received signal, and selecting the hypothesis with the lowest error variance, wherein the hypothesis contains information about interferers present in the received signal is provided.

In accordance with another preferred embodiment of the present invention, a circuit comprising a hypothesis generator, the hypothesis generator containing circuitry to generate a list of hypotheses based upon known sources of interference and timing offsets; and a channel estimator coupled to a signal input and the hypothesis generator, the channel estimator containing circuitry to compute an error variance for each hypothesis from the list of hypotheses with a received signal from the signal input is provided.

In accordance with another preferred embodiment of the present invention, a receiver comprising a radio frequency circuit coupled to a signal input, the radio frequency circuit containing circuitry to filter and amplify a signal provided by the signal input, a hypothesis generator, the hypothesis generator containing circuitry to generate a list of hypotheses based upon known sources of interference and timing offsets, and a channel estimator coupled to radio frequency circuit and the hypothesis generator, the channel estimator containing circuitry to compute an error variance for each hypothesis from the list of hypotheses with a received signal from the signal input is provided.

An advantage of a preferred embodiment of the present invention is that it is a simple, low-complexity method that can exploit the structure of the interference from other devices in the communications network to improve the performance of receivers.

A further advantage of a preferred embodiment of the present invention is that a preferred embodiment of the present invention can be implemented upon existing receivers. This can facilitate a relatively easy implementation of the present invention on existing wireless communications networks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a GSM network operating in synchronous mode. The GSM technical standard can be found in a series of technical documents, wherein a general description can be found in Document 01.02, entitled "General Description of GSM Public Land Mobile Network (PLMN), Revision 6.0.0" published January 2001, which is incorporated herein by reference. The invention may also be applied, however, to other synchronous wireless communications networks which make use of known training sequence at specific locations within the transmission, such as GSM-EDGE (Enhanced Data Rates for GSM Evolution), GPRS (General Packet Radio Service), and so on.

Figure 1:
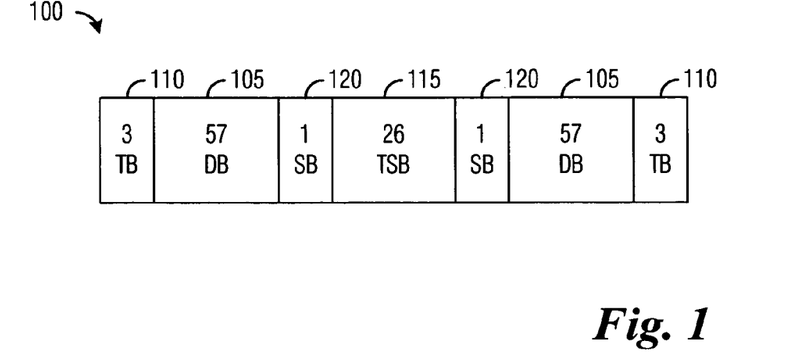
FIG. 1 is a diagram of a transmission burst in a GSM communications system.

With reference now to FIG. 1, there is shown a diagram illustrating a transmission burst 100 in a GSM communications system. Data transmitted in the burst 100 are carried in a pair of 57-bit data fields 105. Two 3-bit fields, referred to as tail bit fields 110, can be used to keep adjacent bursts separate. In many wireless communications systems, transmissions are usually preceded with a field located at the beginning of the transmission. This field is commonly referred to as a preamble and can be used to carry a specific sequence of bits (typically referred to as a training sequence) that can help a receiver detect and decode the transmission. Note that while the use of a preamble is common, it is not the only place within in a transmission to place a training sequence. For example, in a GSM burst, the training sequence is located in the middle of the burst. The burst 100 contains a 26-bit training sequence field 115, which may be separated from the pair of 57-bit data fields 105 by a pair of stealing bit fields 120. Since the training sequence is not at the beginning of the transmission, it referred to as being a mid-amble. Note that the discussion of field specifics (the number of bits in a field, the position of a field, and so forth) is used to enable the discussion using a currently available wireless communications system. It should be evident that the field specifics should have no impact upon the validity of the present invention.

Figure 2:
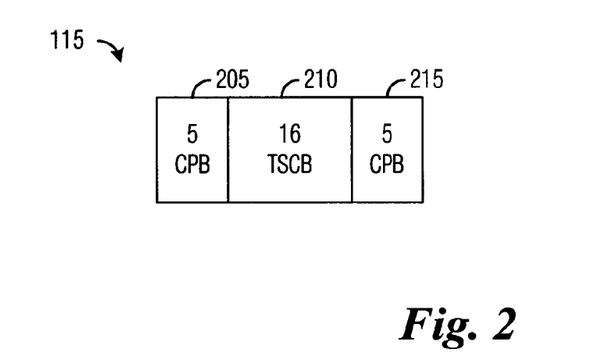
FIG. 2 is a diagram of a training sequence field in a GSM transmission burst.

With reference now to FIG. 2, there is shown a diagram illustrating a detailed view of the GSM 26-bit training sequence field 115. The GSM 26-bit training sequence field 115 can be broken up into three smaller fields, a 5-bit cyclic prefix field 205, a 16-bit training sequence field 210, and a 5-bit cyclic suffix field 215. According to the GSM technical standards, the 5-bit cyclic prefix field 205 contains a copy of the last 5 bits of the 16-bit training sequence field 210 while the 5-bit cyclic suffix field 215 contains a copy of the first 5 bits of the 16-bit training sequence field 210. According to the GSM technical specifications, there are up to eight (8) unique training sequences that may be used in a single GSM communications system.

As discussed previously, interference from other devices from within the same communications network can come in two forms, co-channel and adjacent channel interference. Regardless of the form of interference, the net result may be that the overall performance of the source of the interference and receiver of the interference may be degraded since the transmissions of both the device causing the interference and the device being interfered with are being damaged. Since the number of training sequences is limited (eight in the case of a GSM communications system), it can be possible to use the a priori knowledge of the training sequences to improve the channel estimation performance at a receiver.

Figure 3:
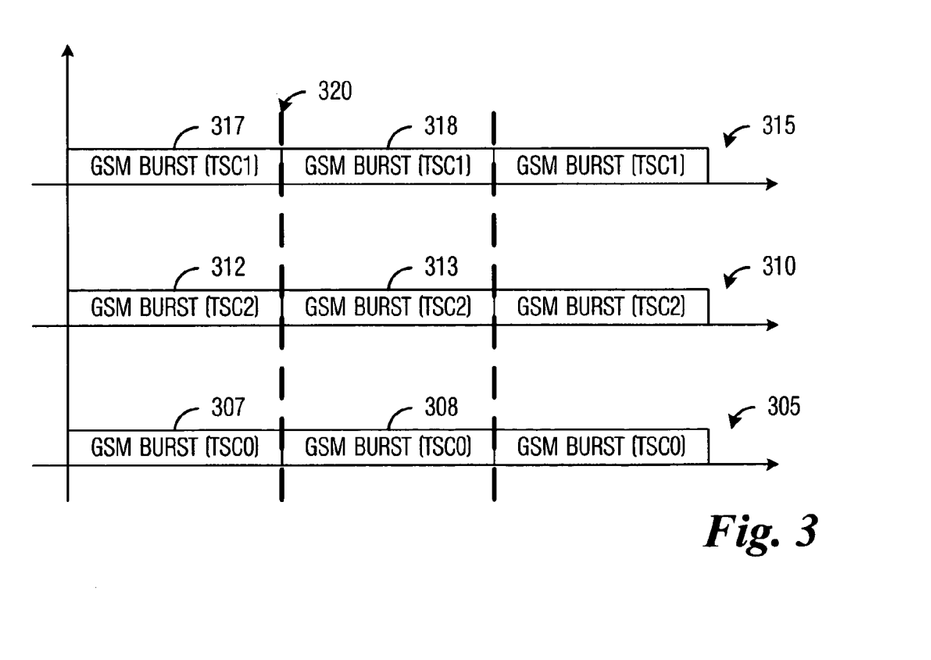
FIG. 3 is a diagram of transmissions from three GSM devices with no timing offset.

With reference now to FIG. 3, there is shown a diagram illustrating the transmissions of three GSM devices, wherein there is no timing offset. Each of three sets of axes (305, 310, and 315) display a series of GSM bursts from a single device. Note that each device uses a different training sequence; TSC for the transmission displayed on axis 305, TSC2 for the transmission displayed on axis 310, and TSC1 for the transmission displayed on axis 315. Note that the GSM communications system displayed in FIG. 3 is a synchronous system, wherein all of the devices transmit at essentially the same time. For example, first GSM bursts 307, 312, and 317 are all transmitted at the same time, as are second GSM bursts 308, 313, and 318. Also note that there is no (or less than a single symbol) timing offset between the transmissions of the three devices. A vertical line 320 denotes the beginning of the second GSM bursts 308, 313, and 318 in all three devices.

Figure 4:
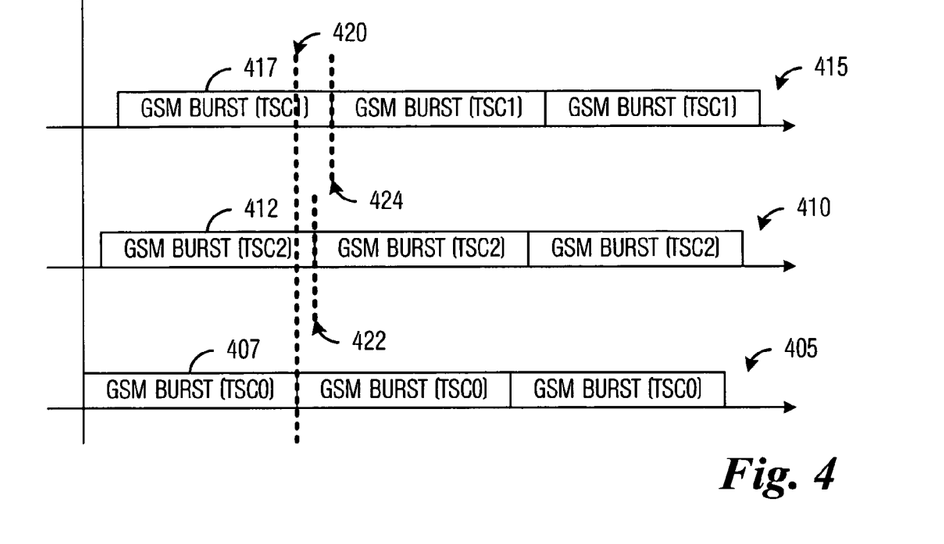
FIG. 4 is a diagram of transmissions from three GSM devices with a timing offset.

With reference now to FIG. 4, there is shown a diagram illustrating the transmissions of three GSM devices, wherein there exists a timing offset. Each of three sets of axes (405, 410, and 415) display a series of GSM bursts from a single device. Unlike in the GSM communications system illustrated in FIG. 3, there is a timing offset in transmissions from the three devices shown in FIG. 4. A first vertical line 420 illustrates the end of a burst 407 and a second vertical line 422 illustrates the end of a burst 412, while a third vertical line 424 illustrates the end of a burst 417. Note that unlike the vertical line 320 (FIG. 3), the first, second, and third vertical lines 420, 422, and 424 do not line up. The timing offset present in the transmissions in the GSM communications system displayed in FIG. 4 can be the result of propagation delays incurred between the transmission of a burst and the time when it arrives at another device within the same communications system. Clock drift between the devices within the communications system can also have an impact upon the timing offset.

A GSM communications system can either be asynchronous or synchronous and can use frequency hopping or not use frequency hopping. A synchronous communications system means that the base stations are synchronized in time to begin transmitting each burst at approximately the same time. In an asynchronous communications system the base stations are not synchronized in time, so each base station can start transmitting a burst with a time offset compared to each other base station. Frequency hopping is a spread spectrum technique that changes transmission frequency after a certain number of transmission units (such as bursts or frames). The transmission frequency changes can follow a pre-specified order (so that both the transmitter and the receiver know the next transmission frequency) or it may be random (with the transmitter telling the receiver the frequency that it is changing to). Frequency hopping can increase the communication system's immunity to interference and reduce its interference causing ability to other electronic devices.

Figure 5:
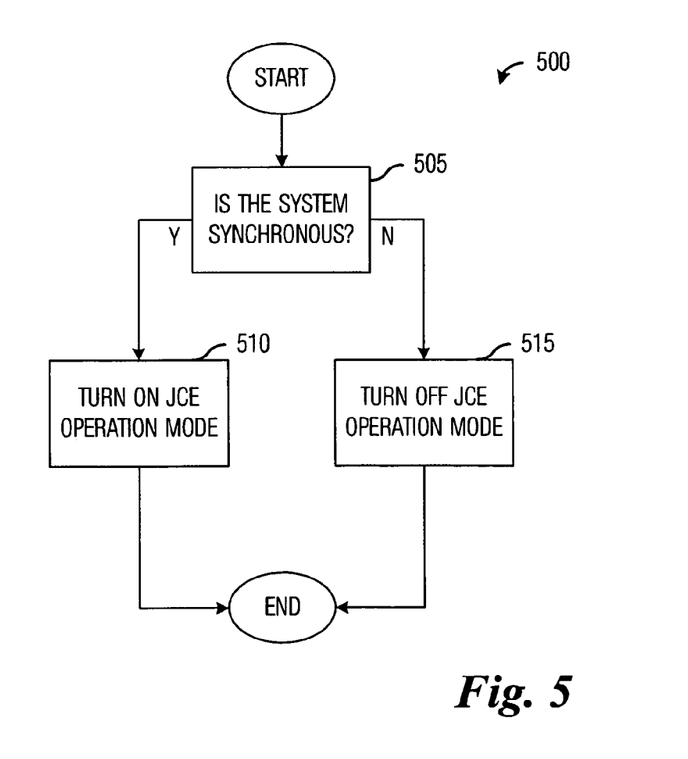
FIG. 5 is a diagram of a process for determining if a joint channel estimation mode can operate, according to a preferred embodiment of the present invention.

With reference now to FIG. 5, there is shown a diagram illustrating a process 500 for determining if a joint channel estimation mode can operate, according to a preferred embodiment of the present invention. According to a preferred embodiment of the present invention, an initial check may need to be made to determine if the joint channel estimation (JCE) mode is compatible with the communications system. For example, a GSM communications system can operate either asynchronously or synchronously and can use or not use frequency hopping. Joint channel estimation may be compatible with synchronous communications systems with or without frequency hopping only.

The process 500 may be executed by a controller or a processing element (neither shown) in a receiver (not shown) in the communications system and may be executed during a power-on initialization sequence. The process 500 may follow such operations as tuning radio frequency receive circuitry, acquiring a cell site (or serving carrier) with which connections can be established, acquiring non-serving cell sites (or non-serving carriers) for purposes of connection hand-offs, and so forth.

The process 500 may begin with the determination if the communications system is synchronous (block 505). A communications system may be able to tell a receiver if it is operating synchronously or asynchronously. If a communications system may not be able to notify a receiver of such information, the receiver may be able to determine the information on its own. Details regarding the determination if the communication system is a synchronous system are provided below. If the communications system is synchronous, then the JCE mode may be compatible and can be turned on (block 510). If the communications system is not synchronous (it is asynchronous), then the JCE mode may not be compatible and can be turned off (block 515). After turning on or off the JCE mode, the process 500 completes.

Figure 6:
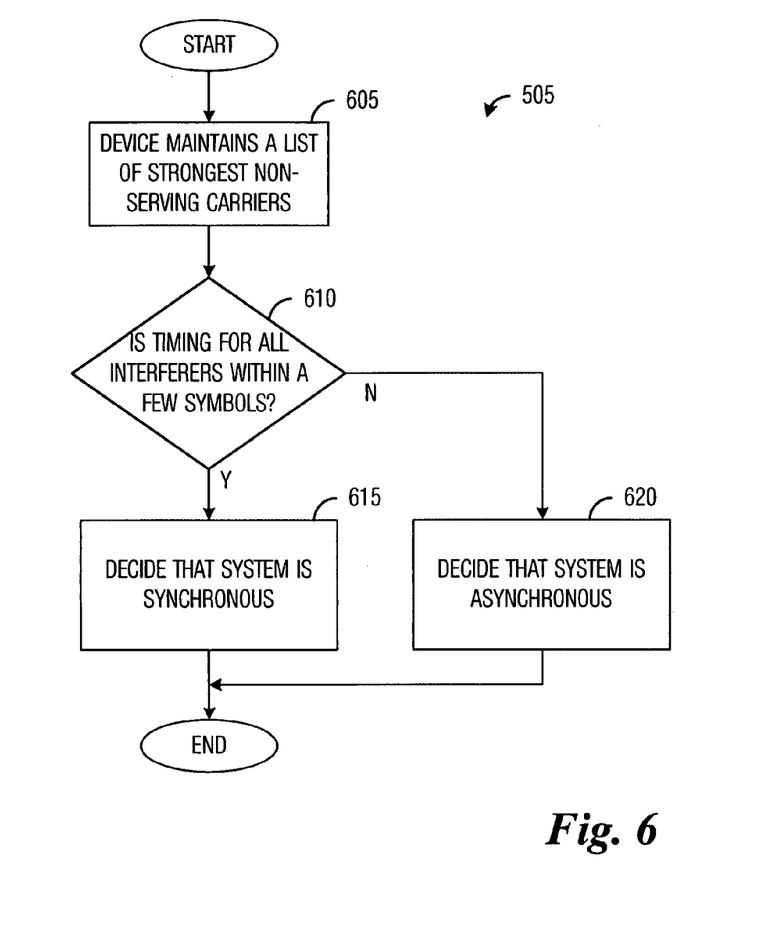
FIG. 6 is a diagram of a process for determining if a communications system is synchronous, according to a preferred embodiment of the present invention.

With reference now to FIG. 6, there is shown a diagram illustrating a process 505 for determining if a communications system is synchronous, according to a preferred embodiment of the present invention. As discussed above, the process 505 may begin after the receiver (or device) has acquired a serving carrier (a cell site) and a list of non-serving carriers (non-serving cell sites). According to a preferred embodiment of the present invention, the receiver may maintain a list of non-serving carriers for the purposes such as facilitating connection hand-offs (block 605). By maintaining this list of non-serving carriers, the receiver can know where to look when it may need to initiate a connection hand-off.

The list of non-serving carriers can however be used to help the receiver determine if the communications system is operating synchronously. The receiver can check to see if the timing of the non-serving carriers is within a few symbols of one another (block 610). If the timing is within a few symbols, then the communications system may be operating synchronously (block 615) and if the timing seems to be random, then the communications system may be operating asynchronously (block 620). Once the operating mode of the communications system has been determined, the process 505 may terminate.

Figure 7:
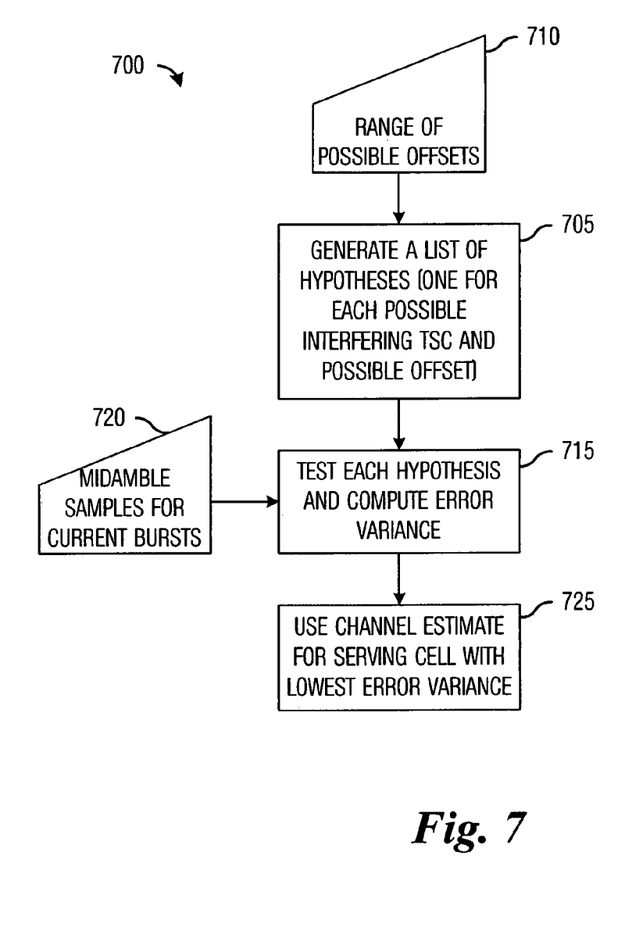
FIG. 7 is a diagram of a process for joint channel estimation, according to a preferred embodiment of the present invention.

With reference now to FIG. 7, there is shown a diagram illustrating a process 700 for joint channel estimation (JCE), according to a preferred embodiment of the present invention. According to a preferred embodiment of the present invention, if the communications system uses frequency hopping, then the JCE process 700 should be executed each time the receiver receives a transmission burst. This may be due to the fact that since the transmission frequencies are continually changing, one received transmission burst may be received with interference and a subsequent transmission burst may be received without interference. However, if the communications system does not use frequency hopping, then the frequency of the execution of the JCE process 700 can be reduced. Alternatively, if the communications system does not use frequency hopping, the JCE process 700 can still be executed with the reception of each transmission burst to enable the fine tuning of the channel estimation to help improve receiver performance. This may be the result of the presence of the interferer in multiple transmission bursts.

The JCE process 700 can begin with the generation of a list of possible hypotheses (block 705). The list of possible hypotheses can be dependent upon the total number of possible interferers and possible timing offsets. The number of possible timing offsets may be provided by the receiver and computed from the list of non-serving carriers (block 710). For example, in a GSM communications system, wherein there is a limit of eight (8) unique training sequences, then the total number of possible interferers is seven (7) since one of the eight training sequences is used by the desired transmission. Then, as an example, in a case where only up to one interferer is considered with no timing offset, the list of possible hypotheses could include:

Hypothesis #1—training sequence 1 (the training sequence of the desired transmission);

Hypothesis #2—training sequence 1 and training sequence 2;

Hypothesis #3—training sequence 1 and training sequence 3;

Hypothesis #4—training sequence 1 and training sequence 4;

Hypothesis #5—training sequence 1 and training sequence 5;

Hypothesis #6—training sequence 1 and training sequence 6;

Hypothesis #7—training sequence 1 and training sequence 7; and

Hypothesis #8—training sequence 1 and training sequence 8.

Note that it would be possible to consider more than one possible interferer with the result of increasing the number of hypotheses to be considered. If timing offsets were considered, then the number of hypotheses in the above example could be equal to:

1+(the number of training sequences−1)*(the number of timing offsets), wherein the one (1) is the hypothesis for the desired transmission alone.

Then, for each hypothesis, an error variance can be computed (block 715). The JCE process 700 may be provided with mid-amble samples from recent bursts received by the receiver (block 720). According to a preferred embodiment of the present invention, the error variance and the channel estimation can be computed using a joint least squares technique. The joint least squares technique is only one of several techniques that can be used. Other techniques, such as: recursive least squares (RLS) and least mean squares (LMS) can be used in place of the joint least squares technique. Additionally, iterative channel estimation in which initial channel estimates are used to make data decisions (before or after equalization) can be used. Then the data bits can be used as virtual pilot symbols to improve the channel estimation in one or more iterations. Note that iterative channel estimation can also be used in asynchronous communications systems. In yet another channel estimation technique, the entire mid-amble (all 26 bits for a GSM communications system) can be used in conjunction with the least squares channel estimation. By using more data, performance may be improved.

To use the joint least squares technique, first, a vector version of the received signal can be expressed as:

$$\underline{r} = S\underline{h} + \underline{n},$$

where $\underline{h}$ is a column vector containing the channel impulse response with L taps and $\underline{r}$ and $\underline{n}$ are both column vectors for the received signal and the noise, each containing the number of samples, M, used from the mid-amble, which for a GSM communications system is typically 16 bits. S is a circulant matrix formed from the training sequence used by the serving carrier. Let the training sequence be denoted as $\underline{s}$ (with K elements, typically 26), which contains elements that are each +1 or −1. The terms of the received signal can also be expressed as:

$$\underline{r} = \begin{bmatrix} r_0 \\ r_1 \\ \vdots \\ r_{M-1} \end{bmatrix} \quad \underline{h} = \begin{bmatrix} h_0 \\ r_h \\ \vdots \\ h_{L-1} \end{bmatrix} \quad \underline{n} = \begin{bmatrix} n_0 \\ n_1 \\ \vdots \\ n_{M-1} \end{bmatrix} \quad \underline{s} = \begin{bmatrix} s_0 \\ s_1 \\ \vdots \\ s_{K-1} \end{bmatrix}$$

Let the number of guard bits in the training sequence be P, which for a GSM communications system is typically 5 bits. The matrix S can then be expressed as:

$$S = \begin{bmatrix} S_P & S_{P-1} & \cdots & S_{P-L+1} \\ S_{P+1} & S_P & \cdots & S_{P-L+2} \\ \vdots & \vdots & & \vdots \\ S_{P+M-1} & S_{P+M-2} & \cdots & S_{P+M-L} \end{bmatrix}.$$

Thus, if L=3, M=16, and P=5, then S is a 16×3 sized matrix. The least squares estimate of $\underline{h}$ can be expressed as:

$$\underline{\hat{h}} = (S^H S)^{-1} S^H \underline{r},$$

where $(.)^H$ denotes the Hermitian matrix operation.

The joint least squares channel estimates from the sum of two signals with different training signals is found by concatenating the $\underline{h}$ vectors and S matrices as shown below. Let $\underline{h}_1$ be the channel for the first signal and $\underline{h}_2$ be the channel for the second signal and $S_1$ and $S_2$ be the circulant matrices corresponding to the training sequences of the two signals.

$$\underline{h}_J = \begin{bmatrix} \underline{h}_1 \\ \underline{h}_2 \end{bmatrix} \text{ and } S_J = [S_1 \quad S_2].$$

The joint least squares estimate of $\underline{h}_J$ can then be expressed as:

$$\underline{\hat{h}}_J = (S_J^H S_J)^{-1} S_J^H \underline{r}.$$

Note that for a single signal with 16 samples used from the midamble and with a channel length of less than or equal to 6, the least squares channel estimate can simplify to:

$$\underline{\hat{h}} = S^H \underline{r}/16$$

for the eight training sequences used in a GSM communications system (due to the structure of the training sequences). Thus for a single signal, a correlation can be used to estimate the channel.

The sum of the squared errors for a single signal can be expressed as:

$$E = \| (I - S(S^H S)^{-1} S^H) \underline{r} \|^2,$$

where I is the identity matrix. Similarly, for joint least squares channel estimates, the sum of the squared error can be expressed as:

$$E = \| (I - S_J (S_J^H S_J)^{-1} S_J^H) \underline{r} \|^2 = \| \underline{r} - S_J (S_J^H S_J)^{-1} S_J^H \underline{r} \|^2.$$

Alternatively, the receiver may make use of the channel estimates to reconstruct the samples from the M samples of the mid-amble and then subtract from the originally received mid-amble to compute the sum of the squared errors.

The computed error variances for each of the hypotheses can be compared and then a channel estimate for the hypothesis corresponding to the lowest computed error variance can be used. For example, if the computed error variance for Hypothesis #5 was found to be the lowest, then the receiver knows that in addition to its desired transmitted signal, a transmission using training sequence 5 is also present. This information (which can include a channel estimate) can be provided to an equalizer (not shown) which could then use the channel estimate to flatten the channel and to extract the desired transmitted signal (block 725).

In addition to executing in the receiver, the JCE process 700 may also execute at the cell site. This can be possible if the signaling structure in the communications system is similar for both the uplink and the downlink. Furthermore, instead of using only two training sequences for JCE (the training sequence of the desired transmitted signal and one other training sequence), a larger set of three or more training sequences can be used. This can have a net result of increasing the number of hypotheses.

Another alternative embodiment is to include any possible delays from the non-serving carriers into the channel impulse responses of the interferers. For example, if the interferers have a channel with three (3) taps and the possible delays are 0, 1, or 2 symbols, then the composite channel response can be considered as five (5) taps. This will allow fewer hypotheses to be generated and tested. In this example only eight (8) hypotheses would be needed. These longer channel impulse responses could be used to determine which training sequence belongs to the strongest interferer. The handset could use the channel estimate for the serving carrier corresponding to this joint channel estimate, or a second channel estimate could be made with the correct interfering training sequence and timing, so the channel impulse response of the interferer would be three taps in this example.

In order to reduce the computation load on the receiver, the receiver can precompute and store the values of $(S_J^H S_J)^{-1}$ in a lookup table. The computation of $(S_J^H S_J)^{-1}$ is perhaps the most computationally intensive portion of the error variance and precomputing it and storing it in a lookup table can significantly reduce the amount of work that the receiver needs to perform each time it computes an error variance for a hypothesis. If the channels are all three (3) tap channels, than the computation would result in a 3×3 matrix. Then, the storage requirements for the lookup table would be on the order of one (1) kilobyte when the number of possible combinations is eight taken two at a time (28 combinations).

In certain situations, when there are no interferers present, it may be desirable to improve the sensitivity performance of the receiver. In such a situation, the error variance of the channel estimate for the single training sequence case can be scaled (for example, by dividing by 1.1), so that the other hypotheses would have to have a lower error value in order for them to be chosen. Scaling can also be used to weight one hypothesis more than the others. This may be useful when a receiver knows that a particular interferer is likely to be present.

The present invention can also be combined with a way to determine the presence of an interferer. This can be a normality test, such as the Bera-Jarque test, the Kolmogorov-Smirnov-Lilliefors test, or the Shapiro-Wilk test, for example. The tests can also be performed on the covariance function. If an interferer is determined to be present, then the present invention can be used, otherwise, it would be turned off. By turning on the present invention only when interferers are detected, the amount of computations that need to be performed can be reduced. Along with the reduction in computation is a corresponding reduction in power consumption. Note that the tests can be more accurate in a communications system that does not use frequency hopping since the interferers are likely to be present in several consecutive transmission bursts. Furthermore, the use of a test to detect the presence of an interferer can be combined with channel estimation to determine which interferers to cancel with joint mean least squares estimation or any other multi-user detection scheme.

Figure 8:
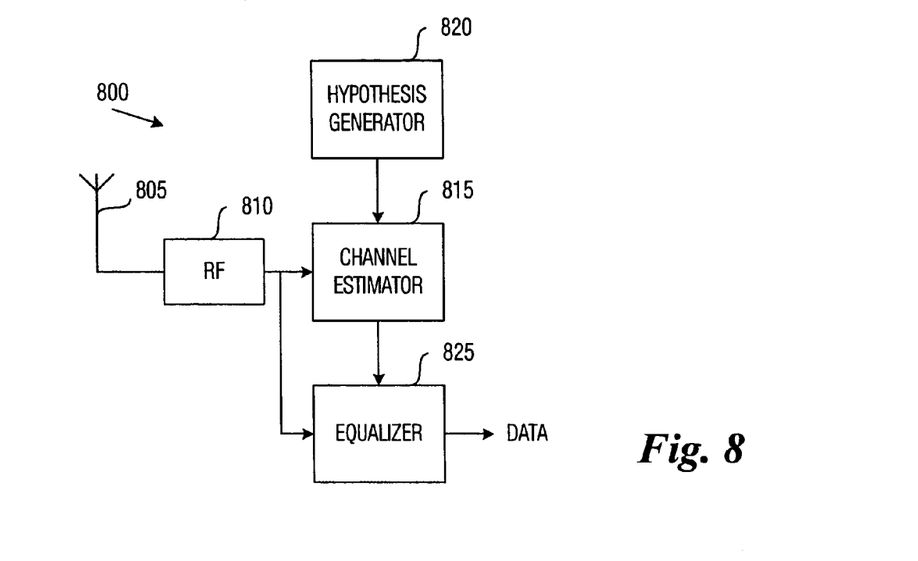
FIG. 8 is a diagram of a portion of a receiver, according to a preferred embodiment of the present invention.

With reference now to FIG. 8, there is shown a diagram illustrating a portion of a receiver 800, according to a preferred embodiment of the present invention. The receiver 800 may receive a signal that is transmitted over-the-air via an antenna 805. The signal received by the antenna 805 may then be provided to a radio frequency (RF) circuit block 810, wherein the signal may be filtered to help eliminate out-of-band interferers, and amplified to bring the signal to a level that is compatible with other circuitry in the receiver 800.

The received signal may then be provided to a channel estimator 815, which can be used to compute a channel estimate and an error variance for the received signal using various hypotheses provided by a hypothesis generator 820. In addition to generating channel estimates and error variances, the channel estimator 815 may also be used to determine the hypothesis that resulted in the smallest error variance. The channel estimate corresponding to the hypothesis with the smallest error variance can be provided to an equalizer 825, which can be used to remove the intersymbol interference (ISI) from the received signal (as provided by the RF circuit block 810). The ISI removal from the received signal by the equalizer 825 can help in extracting the desired transmitted signal from the received signal in the presence of interferers. Note that the portions of the receiver 800 displayed in FIG. 8 may be implemented as either hardware or as software or as firmware. For example, the channel estimator 815, the hypothesis generator 820, and the equalizer 825 may be implemented as either hardware, software, firmware, or a combination thereof. The term circuit and circuitry may therefore apply to hardware, software, or firmware.

Figure 9:
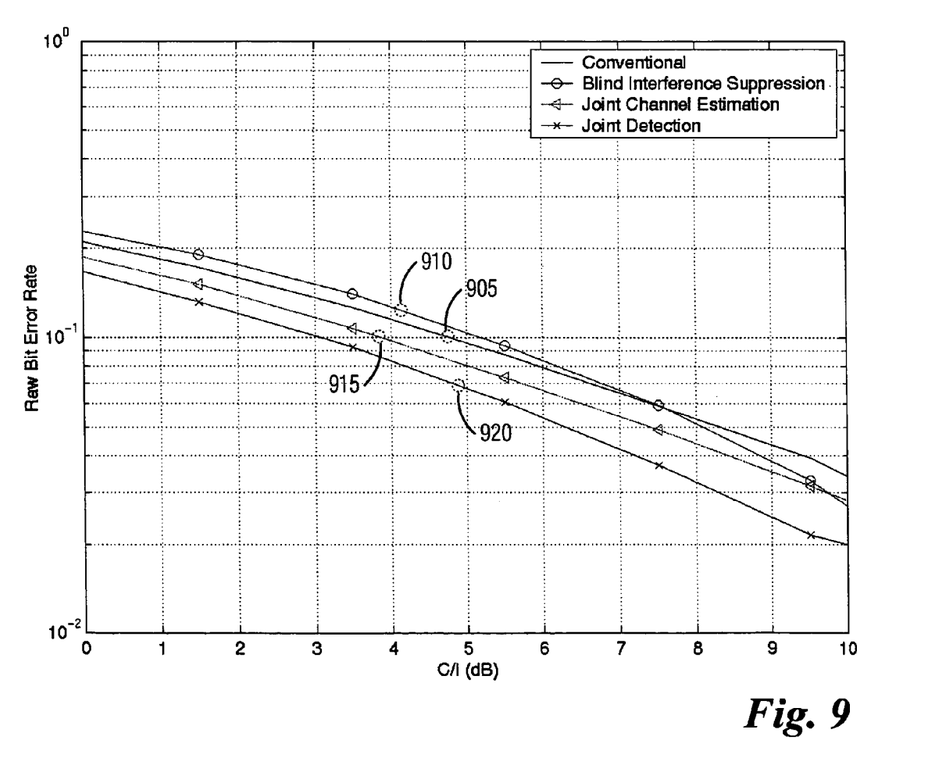
FIG. 9 is a data plot of a comparison of link level performance of several interference cancellation techniques, according to a preferred embodiment of the present invention.

With reference now to FIG. 9, there is shown a data plot illustrating a comparison of link level performance for several interference cancellation techniques, according to a preferred embodiment of the present invention. A first curve 905 shows the bit error rate performance for a conventional receiver (i.e., no interference cancellation) and a second curve 910 shows the bit error rate performance for a receiver using blind interference suppression. A third curve 915 shows the bit error rate performance for a receiver using a preferred embodiment of the present invention and a fourth curve 920 shows the bit error rate performance for a receiver with joint detection. Clearly, the receiver with a preferred embodiment of the present invention (the third curve 915) has better bit error rate performance (performance gains of almost a dB) than a receiver with no interference cancellation (the first curve 905) and a receiver with blind interference suppression (the second curve 910). The receiver with joint detection (the fourth curve 920) shows better performance, but at a cost of increased implementation complexity and reliance of the receiver's ability to determine the presence and timing of interferers (a potentially difficult task).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to

What is claimed is:

1. A method for detecting interferers comprising:
   generating a list of hypotheses;
   receiving a signal transmitted over-the-air;
   computing an error variance for each hypothesis in the list using the received signal; and
   selecting the hypothesis with the lowest error variance, wherein the hypothesis contains timing offset information about interferers present in the received signal.

2. The method of claim 1, wherein a hypothesis contains information about a desired signal and any expected interferers.

3. The method of claim 2, wherein one hypothesis contains only information about the desired signal.

4. The method of claim 2, wherein the information includes a training sequence code.

5. The method of claim 1 wherein a joint least squares technique can be used to compute the error variance.

6. The method of claim 5, wherein a sum of the squared errors for a single signal can be expressed as:

$$E = \|r - S(S^H S)^{-1} S^H \underline{r}\|^2,$$

wherein I is the identity matrix, S is a circulant matrix formed from a data sequence used by the desired signal and is expressible as $$S = \begin{bmatrix} S_P & S_{P-1} & \cdots & S_{P-L+1} \\ S_{P+1} & S_P & \cdots & S_{P-L+2} \\ \vdots & \vdots & & \vdots \\ S_{P+M-1} & S_{P+M-2} & \cdots & S_{P+M-L} \end{bmatrix},$$

$S^H$ is a Hermitian matrix operation on S, and $\underline{r}$ is a received signal.

7. The method of claim 6, wherein $(S_J^H S_H)^{-1}$ can be precomputed.

8. The method of claim 1 further comprising after the selecting, using a channel estimate for the selected hypothesis to recover data from the received signal.

9. The method of claim 1, wherein the method can be turned off if no interferers are detected.

10. The method of claim 9, wherein the presence of interferers can be detected via the use of a normality test.

11. The method of claim 1, wherein the method can be used in a wireless communications system, the method further comprising before the generating:
    determining an operating mode of the wireless communications system; and
    stopping the method if the wireless communications system is operating in an asynchronous mode.

12. The method of claim 11, wherein a serving carrier is a carrier communicating with a device, and wherein the determining comprises:
    obtaining a list of carriers detectable by the device;
    determining that the wireless communications system is operating in a synchronous mode if a range of timing offsets for the carriers in the list is within a few symbols of the serving carrier; and
    determining that the wireless communications system is operating in an asynchronous mode if the range of timing offsets for the carriers in the list is widely varying.

13. A method for detecting interferers comprising:
    generating a list of hypotheses;
    receiving a signal transmitted over-the-air;
    computing an error variance for each hypothesis in the list using the received signal, wherein the error variance for the hypotheses can be scaled to place different weights on different hypotheses; and
    selecting the hypothesis with the lowest error variance, wherein the hypothesis contains information about interferers present in the received signal.

14. A circuit comprising:
    a hypothesis generator, the hypothesis generator containing circuitry to generate a list of hypotheses based upon known sources of interference and timing offsets; and
    a channel estimator coupled to a signal input and the hypothesis generator, the channel estimator containing circuitry to compute an error variance for each hypothesis from the list of hypotheses with a received signal from the signal input.

15. The circuit of claim 14, further comprising a radio frequency circuit coupled to the signal input, the radio frequency circuit containing circuitry to filter and amplify a signal received over-the-air.

16. The circuit of claim 14, wherein the channel estimator further contains circuitry to compute a channel estimate for each hypothesis from the list of hypotheses.

17. The circuit of claim 14, wherein the channel estimator further contains circuitry to select a hypothesis resulting in a smallest error variance.

18. The circuit of claim 17, wherein the channel estimator contains circuitry to compute a channel estimate for each hypothesis from the list of hypotheses, and the circuit further comprising an equalizer coupled to the signal input and the channel estimator, the equalizer containing circuitry to recover transmitted data from the received signal using the channel estimate provided by the channel estimator.

19. A receiver comprising:
    a radio frequency circuit coupled to a signal input, the radio frequency circuit containing circuitry to filter and amplify a signal provided by the signal input;
    a hypothesis generator, the hypothesis generator containing circuitry to generate a list of hypotheses based upon known sources of interference and timing offsets; and
    a channel estimator coupled to the radio frequency circuit and the hypothesis generator, the channel estimator containing circuitry to compute an error variance for each hypothesis from the list of hypotheses with a received signal from the signal input.

20. The receiver of claim 19, wherein the channel estimator contains circuitry to compute a channel estimate for each hypothesis from the list of hypotheses, and the circuit further comprising an equalizer coupled to the signal input and the channel estimator, the equalizer containing circuitry to recover transmitted data from the received signal using the channel estimate provided by the channel estimator.

21. The receiver of claim 19, wherein the receiver is part of a synchronous wireless communications system using a fixed set of training sequences for transmitting information.

22. The receiver of claim 21, wherein the synchronous wireless communications system is GSM compliant.

* * * * *